United States Patent
Miyaji (10) Patent No.: US 10,708,464 B2
(45) Date of Patent: Jul. 7, 2020

(54) IMAGE FORMING APPARATUS THAT PERFORMS CHARGING PROCESSING

(71) Applicant: KYOCERA Document Solutions Inc., Osaka (JP)

(72) Inventor: Naoya Miyaji, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 16/549,469

(22) Filed: Aug. 23, 2019

(65) Prior Publication Data

US 2020/0076984 A1 Mar. 5, 2020

(30) Foreign Application Priority Data

Aug. 31, 2018 (JP) ................................. 2018-163420

(51) Int. Cl.
*G06F 3/12* (2006.01)
*H04N 1/34* (2006.01)

(52) U.S. Cl.
CPC ............ *H04N 1/34* (2013.01); *G06F 3/1207* (2013.01); *G06F 3/1238* (2013.01); *G06F 3/1256* (2013.01); *G06F 2206/1504* (2013.01)

(58) Field of Classification Search
None
See application file for complete search history.

(56) References Cited

U.S. PATENT DOCUMENTS

| | | | | |
|---|---|---|---|---|
| 2010/0296827 | A1* | 11/2010 | Miyahara | G03G 21/02 399/50 |
| 2015/0154667 | A1* | 6/2015 | Hicks | G06Q 30/0279 705/26.41 |
| 2016/0125482 | A1* | 5/2016 | d'Alancon | G06F 3/0484 705/329 |
| 2017/0148002 | A1* | 5/2017 | Stock | G06Q 20/18 |
| 2019/0385221 | A1* | 12/2019 | Cen | G06Q 30/0279 |
| 2020/0051385 | A1* | 2/2020 | Zilba | G07F 17/3244 |

FOREIGN PATENT DOCUMENTS

JP 2012-159663 A 8/2012

\* cited by examiner

*Primary Examiner* — Henok Shiferaw
(74) *Attorney, Agent, or Firm* — IP Business Solutions, LLC (57) ABSTRACT

An image forming apparatus includes a connecting device to which a charging apparatus is connected, an image forming device, an operating device, and a control device. The control device functions as an operation accepter, a controller, a charging processor, and a notifier. The notifier performs a processing for giving a first notice; the first notice is for asking a user whether or not to donate all of or part of a remaining money which is remaining, posterior to charging for a print job, in an inserted amount of money. After the notifier has performed the processing for giving the first notice, when the operation accepter accepts an instruction of execution of the donation, the charging processor performs a charging processing by subtracting, from the inserted amount of money, a charging amount for the print job and an amount of donation indicated by the instruction of execution of the donation.

9 Claims, 9 Drawing Sheets

IMAGE FORMING APPARATUS THAT PERFORMS CHARGING PROCESSING

INCORPORATION BY REFERENCE

This application claims priority to Japanese Patent Application No. 2018-163420 filed on 31 Aug. 2018, the entire contents of which are incorporated by reference herein.

BACKGROUND

The present disclosure relates to an image forming apparatus, and particularly to an image forming apparatus used in a state of being connected to a charging apparatus.

Image forming apparatuses such as copying machines or multifunction machines in some cases are used by being connected to charging apparatuses. The charging apparatuses, sometimes referred to as coin vending machines, receive insertion of money, recognize amount of money inserted, collect charges in accordance with details of print jobs, then return remaining money.

If a user of such the image forming apparatus leaves the place while forgetting to receive remaining money (change), the change may be taken away by a stranger, which may cause damage to the user.

To cope with the problem, there is a known technique that performs authentication to identify users of the image forming apparatus, allows login for an user on a condition that the user is approved as a legitimate user, and if there is remaining money at the time of logging out, the charging apparatus avoids returning the remaining money, stores the un-returned remaining money as remaining money information for the legitimate user, and allows the legitimate user to use the remaining money at the next login.

SUMMARY

A technique improved over the aforementioned technique is proposed as one aspect of the present disclosure.

An image forming apparatus of the one aspect of the present disclosure includes a connecting device, an image forming device, an operating device, and a control device. To the connecting device, a charging apparatus is connected. The charging apparatus accepts insertion of money, collects a charge, and returns remaining money. The image forming device forms an image on a recording medium. Into the operating device, an instruction corresponding to user operation is inputted. The control device includes a processor and functions, when the processor executes a control program, as an operation accepter, a controller, a charging processor, and a notifier. The operation accepter accepts through the operating device the instruction corresponding to the user operation. The controller executes a print job by controlling the image forming device according as details of the print job, the details of the print job being set in accordance with the instruction corresponding to the user operation accepted by the operation accepter. The charging processor executes a charging processing in response to the details of the print job, and manages remaining money remaining in an inserted amount of money inserted into the charging apparatus. The notifier performs a processing for giving a first notice, the first notice being for asking a user whether or not to donate all of or part of the remaining money which is remaining, posterior to the charging for the print job, in the inserted amount of money. After the notifier has performed the processing for giving the first notice, when the operation accepter accepts an instruction of execution of the donation, the charging processor performs the charging processing by subtracting, from the inserted amount of money, a charging amount for the print job and an amount of donation indicated by the instruction of execution of the donation.

DETAILED DESCRIPTION

Figure 1:
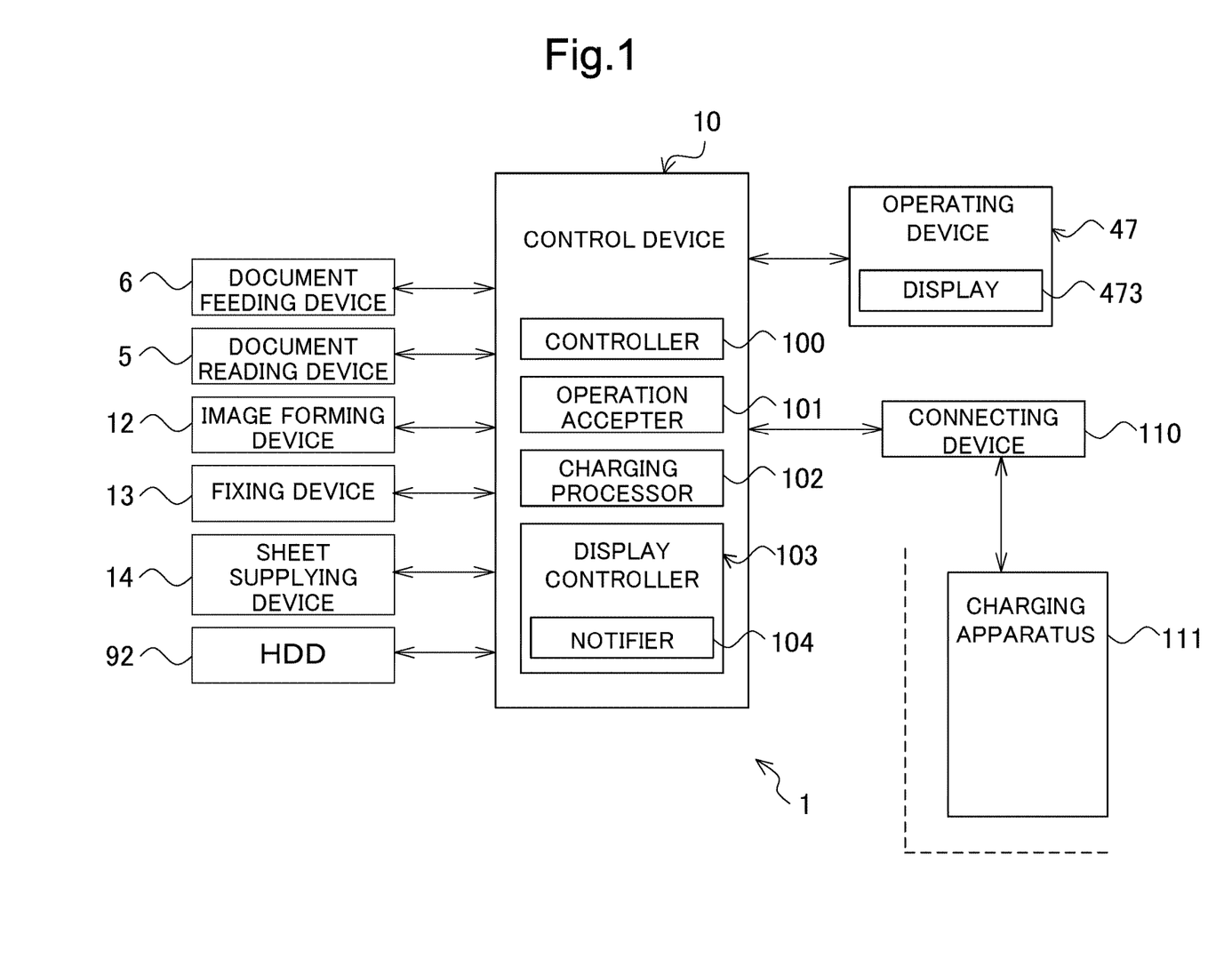
FIG. 1 is a functional block diagram schematically showing an essential internal configuration of an image forming apparatus according to a first embodiment of the present disclosure.

Hereinafter, a description will be given of embodiments of the present disclosure with reference to the drawings. FIG. 1 is a functional block diagram schematically showing an essential internal configuration of an image forming apparatus 1 according to the first embodiment of the present disclosure.

The image forming apparatus 1 is a multi-functional peripheral having multiple functions, including a copy function, a print function, a scan function, and a facsimile function. The image forming apparatus 1 includes a control device 10, a document feeding device 6, a document reading device 5, an image forming device 12, a fixing device 13, a sheet supplying device 14, and an operating device 47. The image forming apparatus 1 is configured as to be connectable with a charging apparatus 111 via a connecting device 110.

The charging apparatus 111 (such as a coin vending machine) is a well-known device configured to receive insertion of money, collect a charge for printing, and return remaining money. The charging apparatus 111 includes a mechanism part formed of, for example, a money insertion slot, a insertion detecting sensor configured to detect insertion of money, a money kind identification sensor configured to identify money kinds, a remaining money display, and a money returning slot. A controller of the charging apparatus 111 is configured to recognize an amount of money inserted, perform charging by subtracting the amount charged in response to the executed printing from the inserted money (the charging processing is performed in accordance with an instruction by a charging processor 102 to be described later), and recognize remaining amount posterior to the charging. The charging apparatus 111 acts under control by the image forming apparatus 1.

The following describes operation of the document reading device 5 when document reading operation is performed at the image forming apparatus 1. The document reading device 5 optically reads an image of an original document conveyed by the document feeding device 6 or an image of an original document placed on a contact glass that is in the role of a document loading stand, and thereby forms image data. The image data formed by the document reading device 5 is stored in an image memory or the like.

The following describes operation of the image forming device 12 and others when the document reading operation is performed at the image forming apparatus 1. Based on, for example, the image data formed through the document reading operation or image data received from a computer that is a network-connected external device, the image forming device 12 forms a toner image on a recording sheet that is in the role of a recording medium supplied from the sheet supplying device 14.

The fixing device 13 applies heat and pressure on the recording sheet on which the toner image has been formed by the image forming device 12 and thereby fixes the toner image onto the recording sheet. The recording sheet having gone through the fixing process is discharged to an output tray. The sheet supplying device 14 has a paper supply cassette.

Into the operating device 47, an instruction corresponding to user operation is inputted. For various types of operations and processes that the image forming apparatus 1 can execute, the operating device 47 accepts, from a user, instructions such as an instruction to perform an image forming operation. The operating device 47 includes a display 473 that can display operation guidance for the user. The display 473 is a touch panel display, and the user is operable the image forming apparatus 1 by touching a button and a key displayed on the touch panel display.

The control device 10 is constituted of a processor, a random-access memory (RAM), a read-only memory (ROM), and an exclusive hardware circuit. Examples of the processor are a central processing unit (CPU), an application specific integrated circuit (ASIC), and a micro processing unit (MPU).

When the processor acts in accordance with a control program store in a hard disk drive (HDD) 92, the control device 10 functions as a controller 100, an operation accepter 101, the charging processor 102, and a display controller 103. The controller 100 and other components may each be constituted in the form of a hardware circuit, instead of being performed in accordance with the control program. This also applies to other embodiments, unless otherwise specifically noted.

The controller 100 controls the overall operation of the image forming apparatus 1. The controller 100 is connected to the document feeding device 6, the document reading device 5, the image forming device 12, the fixing device 13, the sheet supplying device 14, the operating device 47, and the charging apparatus 11, to perform drive control of each component. For example, when the operation accepter 101 accepts an instruction to execute one of the functions of the image forming apparatus 1, the controller 100 executes the instructed function.

The operation accepter 101 accepts through the operating device 47 the instruction corresponding to the user operation. The operation accepter 101, for example, accepts user selection about copy types or sheet sizes, accepts user's input regarding the number of copies to be made, and accepts user instruction to start copying.

When the operation accepter 101 accepts the user instruction to start a print job, such as copying, the controller 100 executes the print job by controlling the image forming device 12 according as details of the print job that is set in accordance with the instruction corresponding to the user operation accepted by the operation accepter 101.

The charging processor 102 executes the charging processing in response to the details of the print job (e.g., the number of the printing sheets, distinction between color and monochrome, and sheet sizes), and manages an inserted amount of money R1, which is the amount of money inserted into the charging apparatus 111. For example, when the controller 100 executes the print job by controlling the image forming device 12 according as details of the print job that is set in accordance with the instruction corresponding to the user operation, the charging processor 102 at this time point transmits to the charging apparatus 111, in accordance with the execution status (progress) of the print job, a signal requesting to perform, on the inserted amount of money R1 that the user has inserted, charging processing based on the completed job. Here, the charging processor 102 may transmit to the charging apparatus 111, at a time point when the execution of the print job is completed, the signal requesting to perform charging processing based on the completed print job.

The charging processor 102 also manages a change reserve fund in the charging apparatus 111: the change reserve fund is the money stored in the charging apparatus 111 and its amount is the amount can be paid out to the user. For example, the charging processor 102 contains respective information on the number of 100 yen coins, 50 yen coins, and 10 yen coins that are stored in the charging apparatus 111, and thereby calculates and stores the change reserve fund in the charging apparatus 111.

The display controller 103 performs display control of the display 473. Also, the display controller 103 functions as a notifier 104. Before the print job is executed, the notifier 104 performs a processing for causing the display 473 to give a first notice: the first notice is for asking the user whether or not to donate all of or part of the remaining money which is remaining, posterior to the charging for the print job, in the inserted amount of money R1 inserted into the charging apparatus 111.

Figure 2:
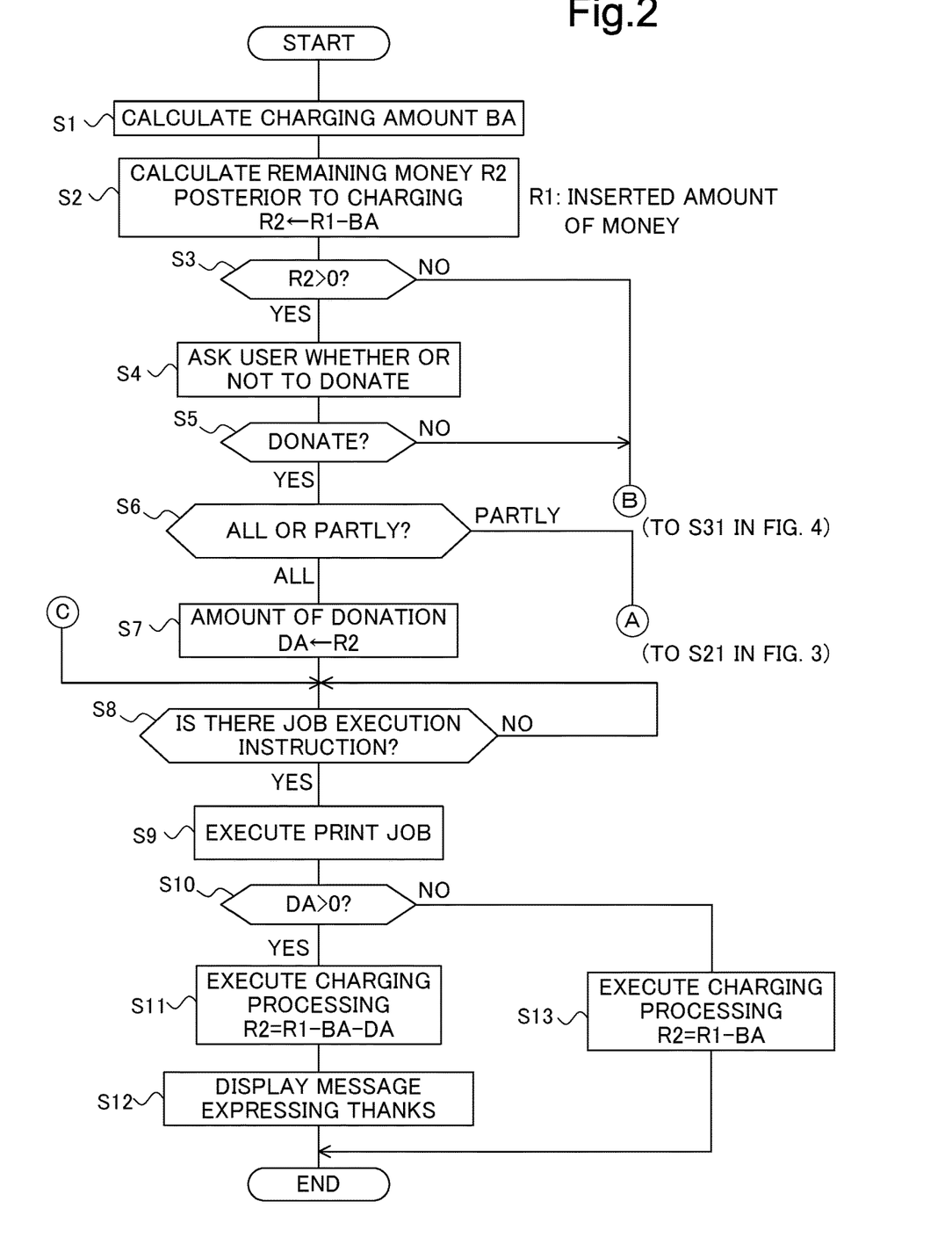
FIG. 2 is a flowchart showing an example of process performed at a control device of the image forming apparatus according to the first embodiment.
Figure 3:
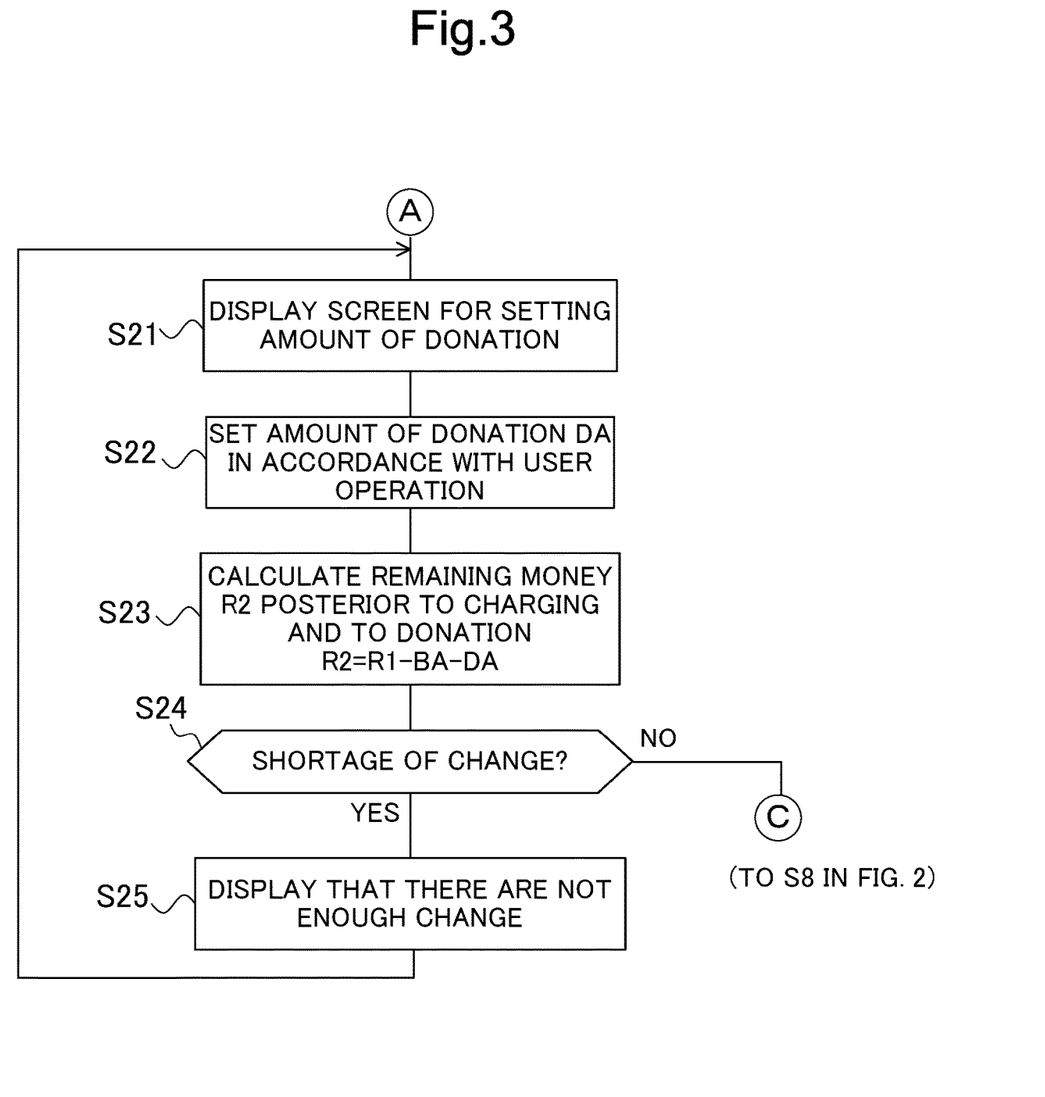
FIG. 3 is a flowchart showing another example of process performed at the control device of the image forming apparatus according to the first embodiment.
Figure 4:
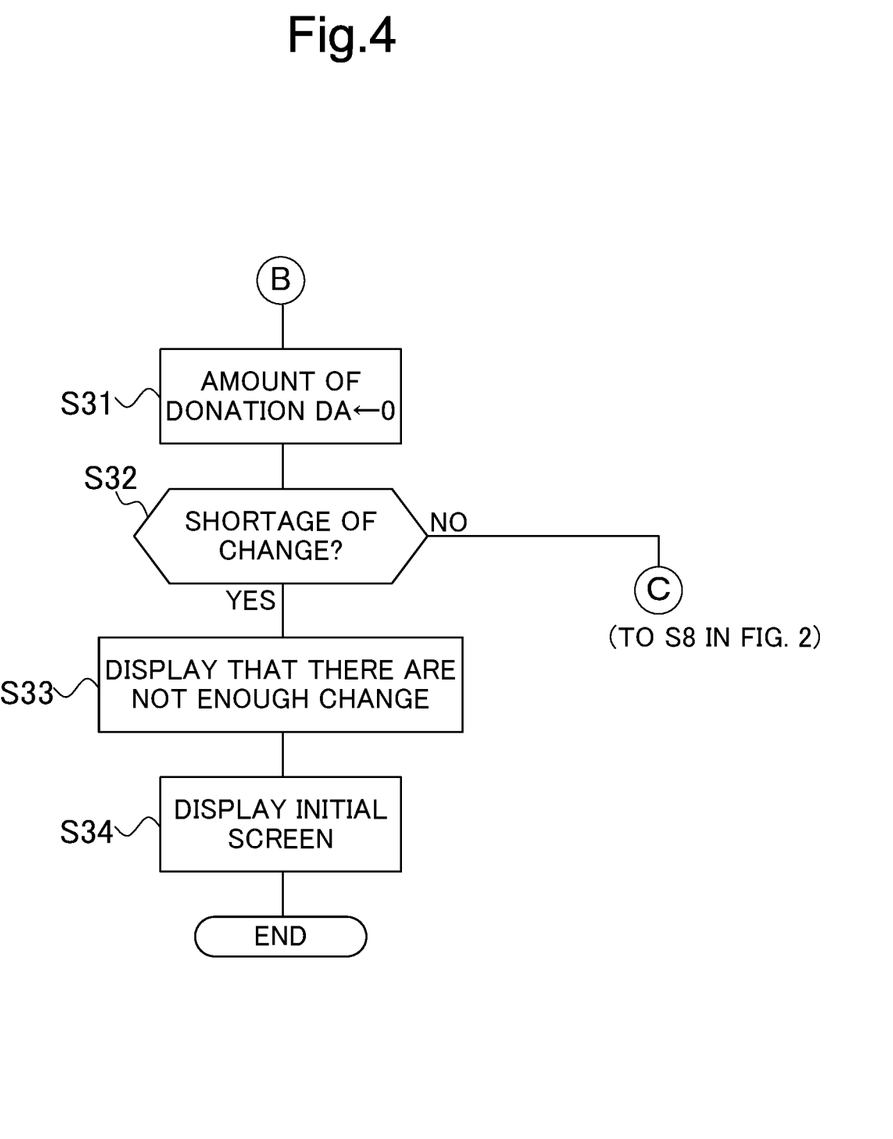
FIG. 4 is a flowchart showing another example of process performed at the control device of the image forming apparatus according to the first embodiment.

Examples of processing performed at the control device 10 of the image forming apparatus 1 according to the first embodiment will be detailed with reference to flowcharts illustrated in FIG. 2 to FIG. 4. The process starts, for example, when the operation accepter 101 accepts user selection about copy types or sheet sizes, and accepts user's input regarding the number of copies to be made.

When the operation accepter 101 accepts user's input regarding the number of copies to be made, the charging processor 102 calculates a charging amount BA for the print job based on the details of the print job set in accordance with the instruction corresponding to the user operation that the operation accepter 101 has accepted (step S1). For example, suppose that, under the condition where the copy type is set as "black and white copying" and also the sheet size is set as "A4 size in standard paper", a unit price of charging is set as "10 yen per sheet". Under the just said condition, if the number of copies to be made is set as "two", the charging processor 102 calculates the charging amount BA as 20 yen. For another example, suppose that, under the condition where the copy type is set as "color copying" and also the sheet size is set as "A3 size in standard paper", a unit price of charging is set as "80 yen per sheet". Under the just said condition, if the number of copies to be made is set as "three", the charging processor 102 calculates the charging amount BA as 240 yen.

Then, the charging processor 102 calculates remaining money R2 which is remaining, posterior to the charging for the print job, in the inserted amount of money R1 inserted into the charging apparatus 111 by subtracting the charging amount BA from the inserted amount of money R1 (step S2). For example, supposing when the inserted amount of money R1 is presently 500 yen and the charging amount BA is 20 yen, the charging processor 102 calculates the remaining money R2 posterior to the charging for the print job is 480 yen.

By determining whether the remaining money R2 posterior to the charging is more than 0 yen, the charging processor 102 determines if there is any remaining money (change) after the print job has been executed (step S3), and when determining that the remaining money R2 posterior to the charging is more than 0 yen and thus the remaining money (change) has been generated (YES in step S3), the notifier 104 causes the display 473 to give the first notice for asking the user whether or not to donate all of or part of the remaining money R2 posterior to the charging (step S4). The notifier 104 causes the display 473 to display the remaining money R2 posterior to the charging to notify the user, together with the execution of the processing for giving the first notice.

Figure 5:
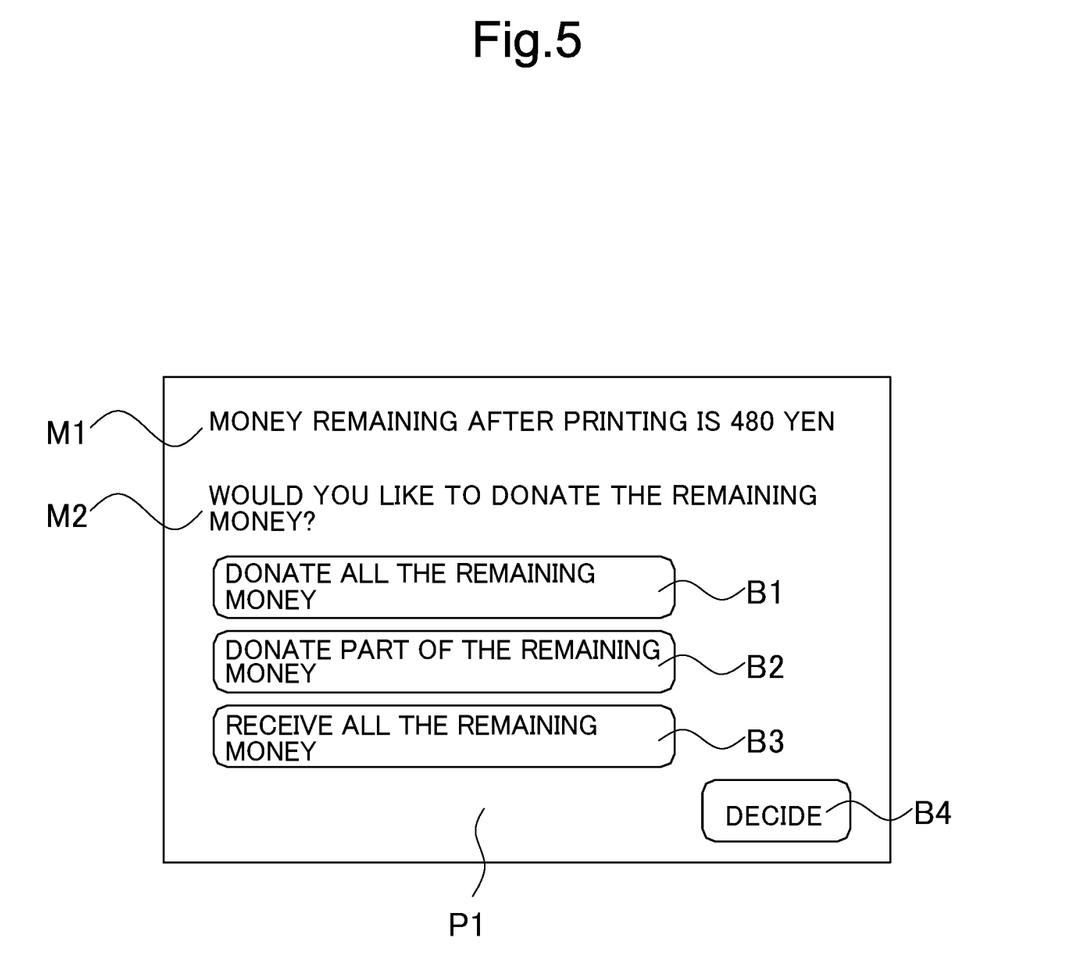
FIG. 5 is a view showing an example of an operation screen displayed on a display.

FIG. 5 is a view showing an example of an operation screen displayed on the display 473 by the control from the notifier 104. The operation screen P1 shows a message M1 "Money remaining after printing is (the remaining money R2) yen" and a message M2 "Would you like to donate the remaining money?". The notifier 104 causes the display 473 to display the numerical value indicated by the remaining money R2 as the remaining money R2 within the message M1.

In addition, the operation screen P1 is provided with selection buttons B1, B2, and B3 where "donate all the remaining money", "donate part of the remaining money", and "receive all the remaining money" are indicated, respectively. The operation screen P1 also includes an execution button B4 indicating "DECIDE".

When the user performs touch operation on the execution button B4 through the touch panel included in the display 473 after touching the selection button B1, the operation accepter 101 accepts an instruction that indicates donating all the remaining money (change). When the user performs touch operation on the execution button B4 after touching the selection button B2, the operation accepter 101 accepts an instruction that indicates donating part of the remaining money. Furthermore, when the user performs touch operation on the execution button B4 after touching the selection button B3, the operation accepter 101 accepts an instruction that indicates a reception of all the remaining money.

Here, it is desirable so set that the operation accepter 101 accepts the instruction that indicates the reception of all the remaining money if the execution button B4 is touched without the touch operation on the selection button B1 to B3 are performed.

After the notifier 104 has performed the execution of the processing for giving the first notice, the charging processor 102 determines whether the operation accepter 101 is accepting the instruction of execution of the donation (step S5). For example, when either one of the selection buttons B1 and B2 is touched and the execution button B4 is touched furthermore, the charging processor 102 determines that the instruction of execution of the donation is received. When just said operation is not performed, the charging processor 102 determines that the instruction of execution of the donation is not received.

When determining that the operation accepter 101 is accepting the instruction of execution of the donation (YES in S5), the charging processor 102 determines if the operation accepter 101 is accepting the instruction for donating all the remaining money or accepting the instruction for donating part of the remaining money (step S6). For example, when the selection button B1 is touched and the execution button B4 is touched furthermore, the charging processor 102 determines that the instruction for donating all the remaining money is being received. When the selection button B2 is touched and the execution button B4 is touched furthermore, the charging processor 102 determines that the instruction for donating part of the remaining money is being received.

When determining that the operation accepter 101 is accepting the instruction for donating all the remaining money ("ALL" in step S6), the charging processor 102 sets the amount of donation DA to the remaining money R2 (step S7). Thereafter the processing goes to step S8 at which the controller 100 performs the processing for executing the print job.

On the other hand, when determining that the operation accepter 101 is accepting the instruction for donating part of the remaining money ("PARTLY" in step S6), the processing goes to step 21 (FIG. 3) at which the notifier 104 causes the display 473 to display an operation screen P2 for receiving the user's input about the amount of donation (FIG. 6) (step S21).

Figure 6:
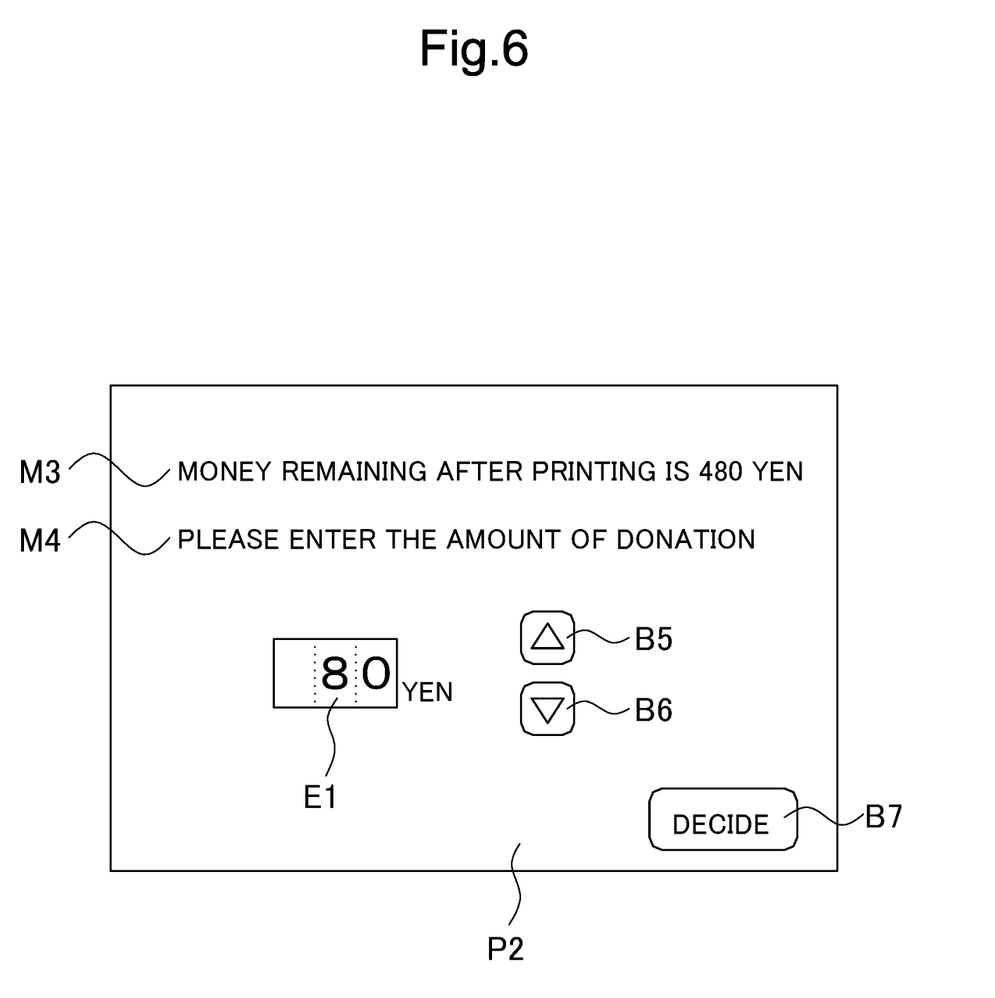
FIG. 6 is a view showing another example of the operation screen displayed on the display.

FIG. 6 is a view showing another example of the operation screen displayed on the display 473 by the control from the notifier 104. The operation screen P2 shows a message M3 "Money remaining after printing is (the remaining money R2) yen" and a message M4 "Please enter the amount of donation". The notifier 104 causes the display 473 to display the numerical value indicated by the remaining money R2 as the remaining money R2 within the message M3.

The operation screen P2 is also provided with an area E1 for displaying the amount of donation together with a selection button B5 indicating "up" and a selection button B6 indicating "down". Furthermore, the operation screen P2 shows an execution button B7 indicating "DECIDE". Every time the selection button B5 is touched, the amount of money displayed in the area E1 is increased by 10 yen and displayed, and every time the selection button B6 is touched, the amount of money displayed in the area E1 is decreased by 10 yen and displayed. When the execution button B7 is touched, the operation accepter 101 accepts an instruction to accept the amount of money being displayed in the area E1 at that time as the amount of donation, and the charging processor 102 sets that amount of money as the amount of donation DA. Here, an upper limit and a lower limit of the amount of money displayed in the area E1 are the remaining money R2 and 10 yen, respectively.

The charging processor 102 sets the amount of donation DA in accordance with the instruction accepted by the operation accepter 101 (step S22), the charging processor 102 calculates the remaining money R2 posterior to the charging for the print job and to the donation by subtracting the charging amount BA and the amount of donation DA from the inserted amount of money R1 inserted into the charging apparatus 111 (step S23). For example, if the inserted amount of money R1 is 500 yen, the charging amount BA is 20 yen, and the amount of donation DA is 80 yen, the charging processor 102 calculates 400 yen as the remaining money R2 posterior to the charging.

Based on the change reserve fund in the charging apparatus 111 and on the remaining money R2 which is remaining, posterior to the charging for the print job and to the donation, in the inserted amount of money R1 inserted into the charging apparatus 111, the charging processor 102 determines whether or not a shortage of change will occur (step S24). When determining that the change will not be short (NO in step S24), the processing goes to step S8 (FIG. 2) at which the controller 100 performs the processing for executing the print job.

On the other hand, when determining that the shortage of change will occur (YES in step S24), the charging processor 102 does not go to the processing for executing the print job, and the notifier 104 causes the display 473 to display the operation screen indicating that there are not enough change (step S25). The processing returns to step S21 thereafter.

When the charging processor 102 determines in step S3 (FIG. 2) that the remaining money R2 posterior to the charging is not more than 0 yen (i.e., R2 is 0 yen) so that there will be no remaining money (change) (NO in step S3), or when the charging processor 102 determines in step S5 (FIG. 2) that the operation accepter 101 is accepting an instruction of inexecution of the donation (NO in step S5), the processing goes to step S31 (FIG. 4), and the charging processor 102 sets the amount of donation DA to 0 yen (step S31). Here, descriptions are given on the premises that there is no case where the charging amount due to the execution of the print job exceeds the inserted amount of money R1.

The charging processor 102 then determines, based on the change reserve fund and the remaining money R2 posterior to the charging for the print job, whether or not the shortage of change will occur (step S32). When determining that the change will not be short (NO in step S32), the processing goes to step S8 (FIG. 2) at which the controller 100 performs the processing for executing the print job.

On the other hand, when determining that the shortage of change will occur (YES in step S32), the charging processor 102 does not go to the processing for executing the print job, and the notifier 104 causes the display 473 to display the operation screen indicating that there are not enough change (step S33). Furthermore, the display controller 103 causes the display 473 to display an initial screen previously registered (step S34). The processing ends thereafter.

In step S8 (FIG. 2) when the operation accepter 101 accepts an instruction to start printing (YES in step S8), the controller 100 executes the print job by controlling the image forming device 12 according as details of the print job that is set in accordance with the instruction corresponding to the user operation accepted by the operation accepter 101 (step S9).

When the execution of the print job is finished, by determining whether the amount of donation DA is more than 0 yen, the charging processor 102 determines if the donation is to be made (step S10), and when determining that the amount of donation DA is more than 0 yen and thus the donation is to be made (YES in step S10), the charging processor 102 executes the charging processing by subtracting the charging amount BA and the amount of donation DA from the inserted amount of money R1 (step S11). The notifier 104 causes the display 473 to display an operation screen on which a message saying, for example, "(the amount of donation DA) yen has been donated. Thank you." is shown (step S12). The processing ends thereafter.

For example, when the inserted amount of money R1 is 500 yen, the charging amount BA is 20 yen, and the amount of donation DA is 480 yen, the remaining money R2 is to be 0 yen, and when the amount of donation DA is 80 yen, the remaining money R2 is to be 400 yen. The notifier 104 causes the display 473 to display the numerical value indicated by the amount of donation DA as the amount of donation within the aforesaid message.

In contrast, when determining that the amount of donation DA is not more than 0 yen (i.e., DA is 0 yen) and that the donation is not to be made (NO in step S10), the charging processor 102 executes the charging processing by subtracting the charging amount BA from the inserted amount of money R1 (step S13). The processing ends thereafter.

In conventional techniques, it is possible to prevent the removal of the remaining money by a third person. However, if the user never logs in again after logging out, the remaining money remains unused. In other words, there will be dormant remaining money. If such users increase, the dormant remaining money also increases.

According to the first embodiment, in contrast, by allowing the user to choose how to handle the remaining money (change), it is possible to raise user awareness of the remaining money, and it helps to prevent forgetting to receive the remaining money. This can result in minimize dormant remaining money. Furthermore, it is possible to contribute to society using the remaining money that the user deems unnecessary, and can be expected to raise the user's awareness of social contribution. Also, even in the case where conventionally the print job is unexecutable due to the shortage of change, it is possible in the first embodiment to avoid occurrence of the shortage of change, so that the print job can be executed.

Figure 7:
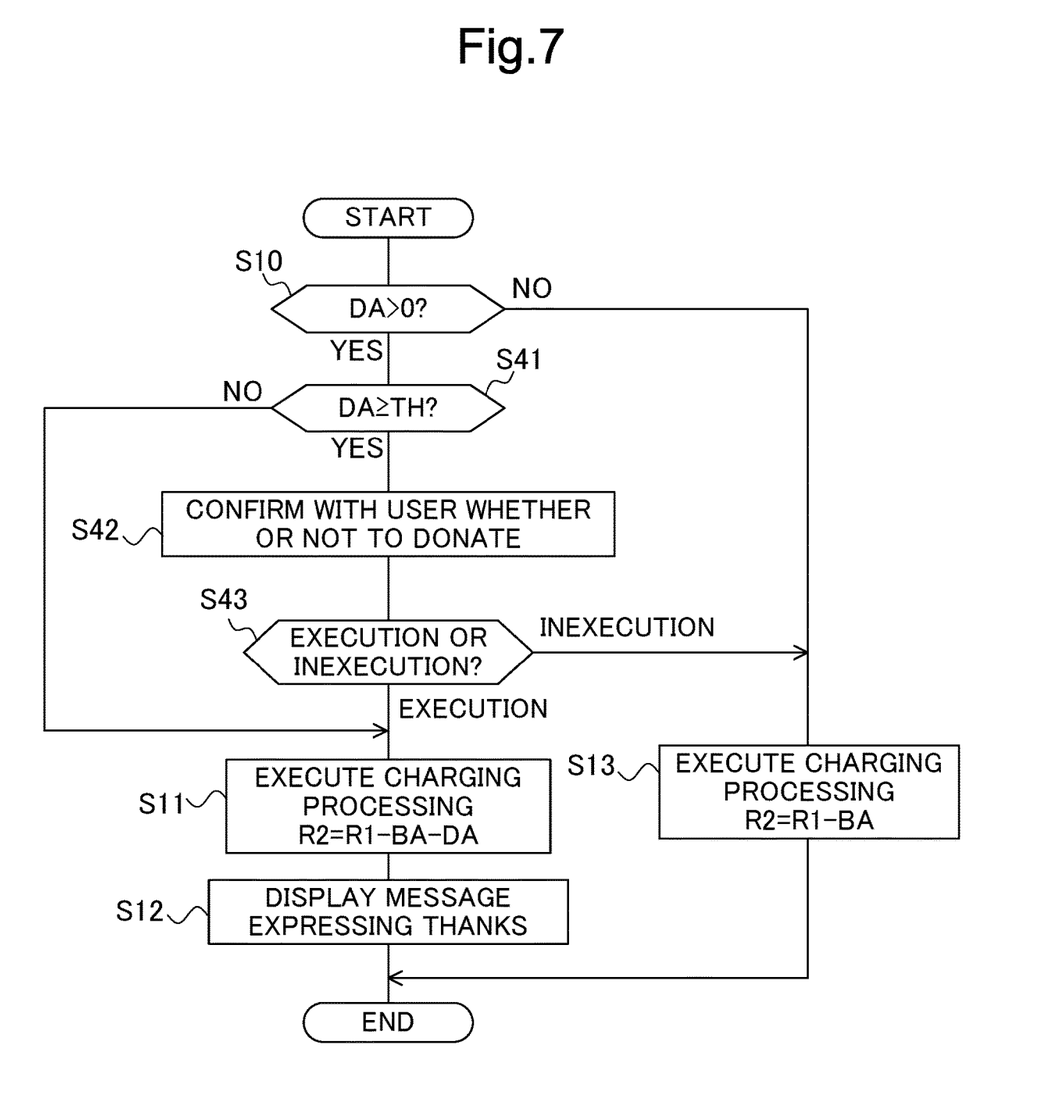
FIG. 7 is a flowchart showing an example of process performed at the control device of the image forming apparatus according to a second embodiment.

Hereinafter, an example of processing performed at the control device 10 of the image forming apparatus 1 according to the second embodiment will be described on the basis of a flowchart shown in FIG. 7. The processing performed at the control device 10 of the image forming apparatus 1 according to the second embodiment includes the same processing as step S1 to step S10 in the flowchart shown in FIG. 2 is performed. Therefore, the flowchart in FIG. 7 illustrates the processing after step S10.

When determining that the amount of donation DA is more than 0 yen and the donation is to be made (YES in step S10), the charging processor 102 determines whether the amount of donation DA is a predetermined amount of money TH (for example 100 yen) or greater (step S41). When the charging processor 102 determines that the amount of donation DA is the amount of money TH or greater (YES in step S41), the notifier 104 executes processing for causing the display 473 to give a second notice for confirming with the user about execution or inexecution of the donation (step S42).

After the notifier 104 has performed the execution of the processing for giving the second notice, the charging processor 102 determines whether the operation accepter 101 is accepting the instruction of execution of the donation (step S43). When determining that the operation accepter 101 is accepting the instruction of execution of the donation ("EXECUTION" in step S43), the charging processor 102 calculates the remaining money R2 by subtracting the charging amount BA and the amount of donation DA from the inserted amount of money R1 and thereby executes the charging processing (step S11). The notifier 104 causes the display 473 to display an operation screen on which the message saying "(the amount of donation DA) yen has been donated. Thank you." is shown (step S12). The processing ends thereafter.

In contrast, when determining that the operation accepter 101 is accepting the instruction of inexecution of the donation ("INEXECUTION" in step S43), the charging processor 102 calculates the remaining money R2 by subtracting the charging amount BA from the inserted amount of money R1 and thereby executes the charging processing (step S13). The processing ends thereafter.

When determining in step S41 that the amount of donation DA is not the amount of money TH or greater (NO in step S41), the charging processor 102 does not perform step S42 and step S43 and the processing goes to step S11.

According to the second embodiment, when the amount of donation DA is not the amount of money TH or greater, after finishing a printing job, donation processing is executed immediately. When the amount of donation DA is the amount of money TH or greater, and is found relatively high, the processing for notifying the user of the execution of the donation is performed again after finishing the printing job. Thereby it is possible to prevent making an expensive donation owing to user's misoperation.

In the first embodiment and the second embodiment, descriptions are given to the case of setting the amount of donation DA without an upper limit within a range of the remaining money R2 posterior to the charging is described. As another embodiment, the charging processor 102 may accept the amount of donation DA only within a range of a predetermined upper limit to prevent making an expensive donation owing to misoperation.

For example, similar to the first embodiment and the second embodiment, if the predetermined upper limit is 100 yen and the remaining money R2 posterior to the charging is 80 yen, the charging processor 102 is allowed to set the amount of donation DA as up to 80 yen (the remaining money R2). If the remaining money R2 posterior to the charging is 480 yen, the charging processor 102 is allowed to set the amount of donation DA as up to the upper limit 100 yen.

As still another embodiment, the charging processor 102 may set the amount of donation DA as a fraction less than the amount of money of a predetermined type of coin within the remaining money R2 posterior to the charging. For example, if the coins that can be inserted into the charging apparatus 111 are 10 yen, 50 yen, 100 yen, and 500 yen, and the amount of the coin of predetermined type is 100 yen, the charging processor 102 accepts, as less than 100 yen being the upper limit (i.e., "90 yen" which is the remaining money (change) in units of 10 yen), the amount of donation DA. For example, when the remaining money R2 posterior to the charging is 480 yen, 80 yen (i.e., the fraction of less than 100 yen) becomes the amount of donation DA. This makes the user feel easier to opt for receiving the change since there become no fractions from the change.

Figure 8:
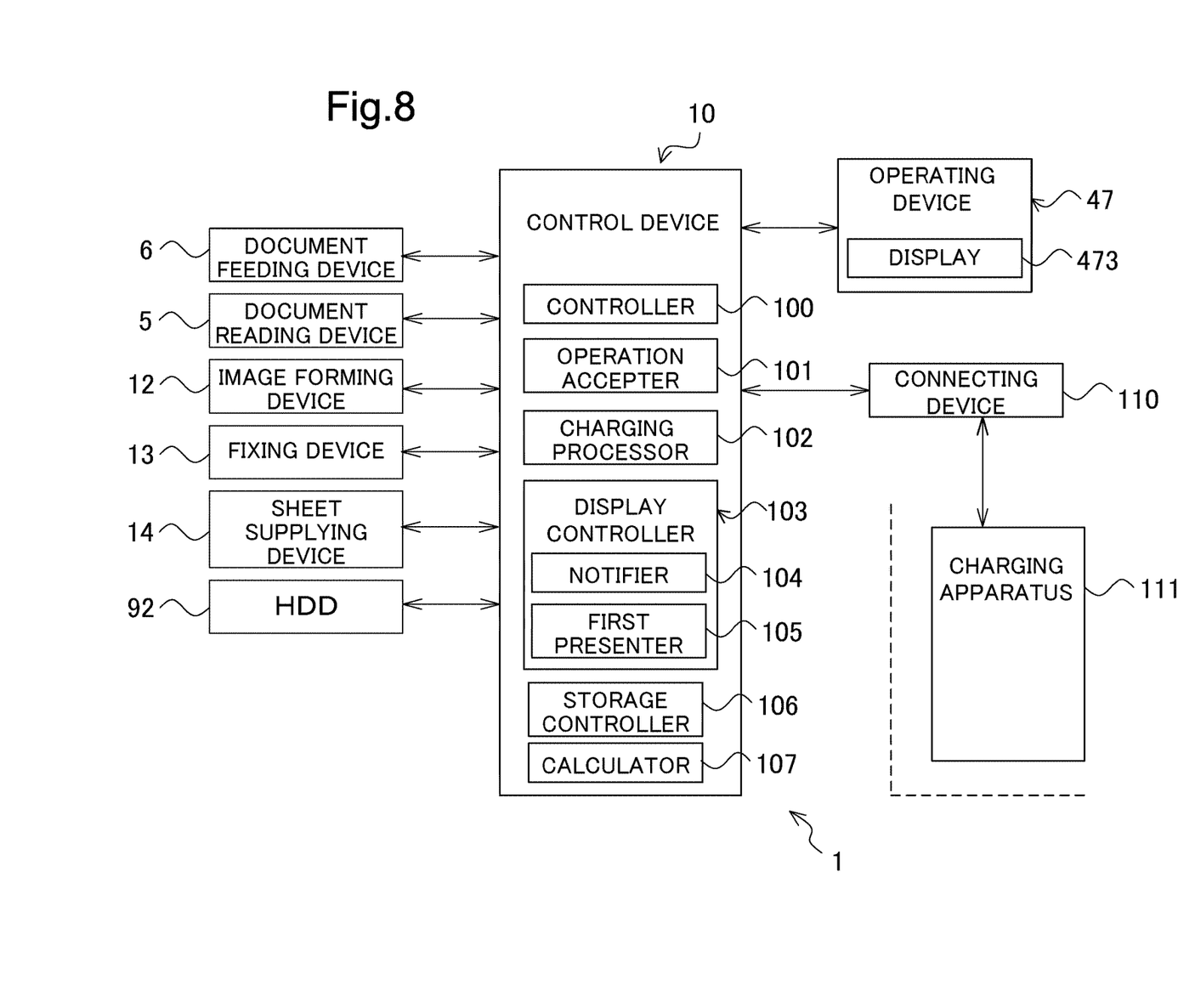
FIG. 8 is a functional block diagram schematically showing an essential internal configuration of the image forming apparatus according to a third embodiment of the present disclosure.

FIG. 8 is a functional block diagram schematically showing the essential internal configuration of an image forming apparatus 1 according to the third embodiment. When compared with the image forming apparatus 1 according to the first embodiment, the image forming apparatus 1 according to the third embodiment is different therefrom for the following point: the display controller 103 further functions as a first presenter 105; and the control device 10 further functions as a storage controller 106 and a calculator 107. When the processor acts in accordance with the control program store in the HDD 92, the control device 10 functions further as the storage controller 106 and the calculator 107.

The storage controller 106 causes the HDD 92 to store history data of the amount of donation DA. After the charging processor 102 executes the charging processing in step S11 (FIG. 2), on the basis of date and time information clocked by a clock device built in the control device 10, the controller 100 causes the storage controller 106 to cause the HDD 92 to store the history data of the amount of donation DA in association with the date and time at which the charging processing is executed.

On the basis of the history data stored in the HDD 92, the calculator 107 calculates a total amount of donations for all users using the image forming apparatus 1 within a predetermined period (for example, last month). The first presenter 105 causes the display 473 to display the total amount of money calculated by the calculator 107.

In the third embodiment, the total amount of donations is displayed on the display 473, so that by making the user aware of the total amount of donation at the time point, it is possible to further enhance the intention of the user to make a donation. In addition, although the case where the total amount of donations is displayed on the display 473 of the image forming apparatus 1 is described here, as another embodiment, the controller 100 may be configured to transmit information on the total amount to the charging apparatus 111, and cause the display of the charging apparatus 111 to display the total amount.

Figure 9:
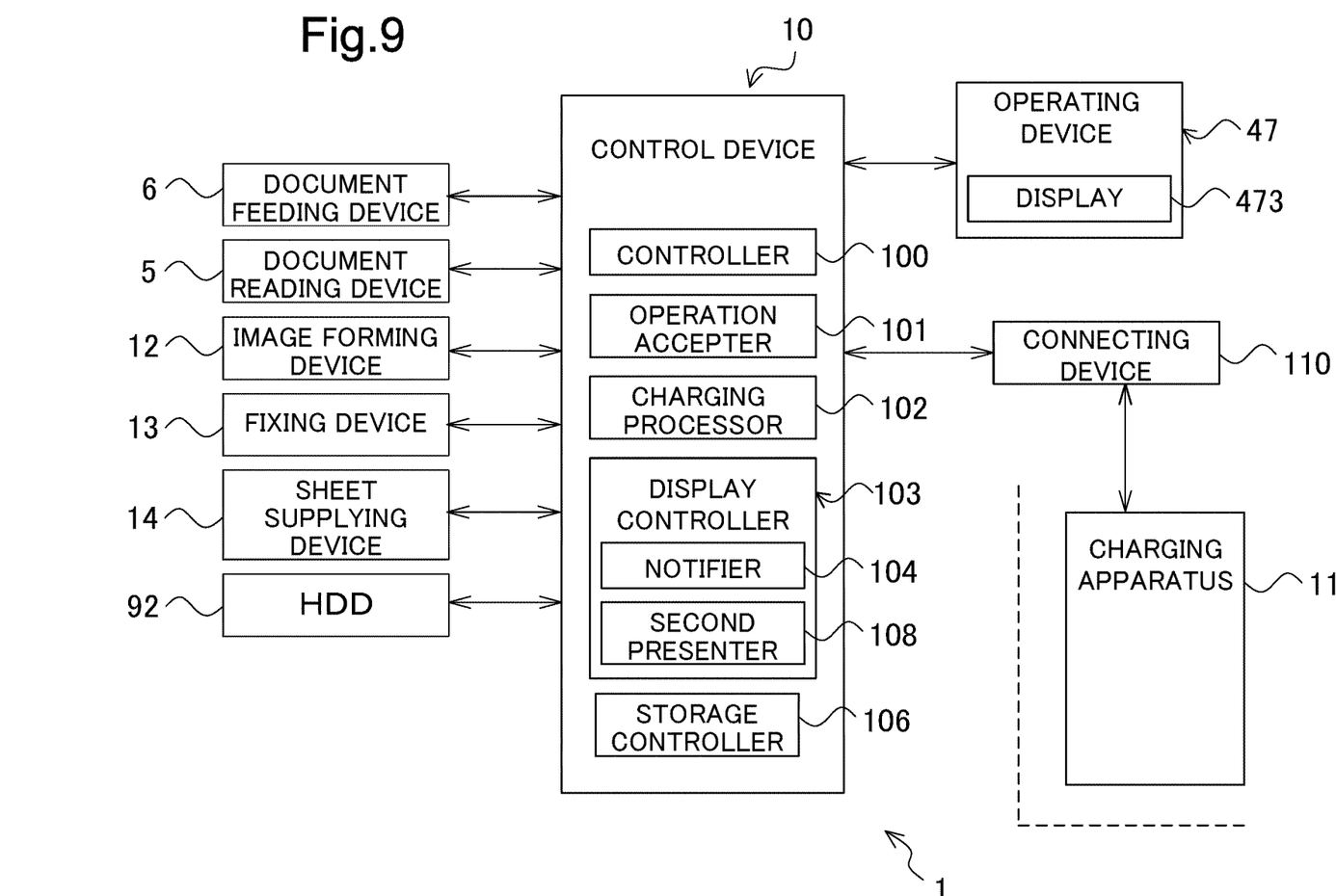
FIG. 9 is a functional block diagram schematically showing an essential internal configuration of the image forming apparatus according to a fourth embodiment of the present disclosure.

FIG. 9 is a functional block diagram schematically showing the essential internal configuration of an image forming apparatus 1 according to the fourth embodiment. When compared with the image forming apparatus 1 according to the first embodiment, the image forming apparatus 1 according to the fourth embodiment is different therefrom for the following point: the display controller 103 further functions as a second presenter 108; and the control device 10 further functions as the storage controller 106. When the processor acts in accordance with the control program store in the HDD 92, the control device 10 functions further as the second presenter 108.

On the basis of the history data stored in the HDD 92, the second presenter 108 causes the display 473 to display a list with the amount of donation of each predetermined number of users who have used the image forming apparatus 1 in a past. For example, when the operation accepter 101 accepts the instruction to display the aforesaid list from the user, the second presenter 108 performs the display of the list.

Similar to the third embodiment, in the fourth embodiment, the list of the amount of donation is displayed on the display 473 and it gives the user a competitive feeling that the donation amount is higher or lower compared to other users. This makes it possible to further enhance the intention of the user to make a donation.

The present disclosure is not limited to the configurations described in the above embodiments and various changes and modifications may be made. Although the description of the above embodiment is given taking the multifunction machine as one example of the image forming apparatus according to the present disclosure, the example is merely illustrative and the image forming apparatus may be other image forming apparatus having, for example, copy function or print function.

The configurations and processing shown in the above embodiments with reference to FIGS. 1 to 9 are merely illustrative of the present disclosure and not intended to limit the present disclosure to the above particular configurations and processing.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
   a connecting device to which a charging apparatus is connected, the charging apparatus accepting insertion of money, collecting a charge by, and returning remaining money;
   an image forming device forming an image on a recording medium;
   an operating device into which an instruction corresponding to user operation is inputted; and
   a control device including a processor and functioning, when the processor executes a control program, as:
   an operation accepter accepting through the operating device the instruction corresponding to the user operation;
   a controller executing a print job by controlling the image forming device according as details of the print job, the details of the print job being set in accordance with the instruction corresponding to the user operation accepted by the operation accepter;
   a charging processor executing a charging processing in response to the details of the print job, and managing remaining money remaining in an inserted amount of money inserted into the charging apparatus; and
   a notifier performing a processing for giving a first notice, the first notice being for asking a user whether or not to donate all of or part of the remaining money which is remaining, posterior to the charging for the print job, in the inserted amount of money, and
   wherein after the notifier has performed the processing for giving the first notice, when the operation accepter accepts an instruction of execution of the donation, the charging processor performs the charging processing by subtracting, from the inserted amount of money, a charging amount for the print job and an amount of donation indicated by the instruction of execution of the donation.

2. The image forming apparatus according to claim 1, wherein
   before the print job is executed, the charging processor calculates the remaining money remaining in the inserted amount of money by subtracting the charging amount for the print job from the inserted amount of money, and
   before the print job is executed, the notifier executes the processing for giving the first notice and a processing for notifying the user of the remaining money remaining in the inserted amount of money calculated by the charging processor.

3. The image forming apparatus according to claim 1, wherein
   when the amount of donation is equal to or greater than a predetermined amount, the notifier further performs a processing for giving a second notice, the second notice being for confirming with the user about execution or inexecution of the donation, and
   after the notifier has performed the processing for giving the second notice, when the operation accepter accepts the instruction of execution of the donation, the charging processor performs the charging processing by subtracting, from the inserted amount of money, the charging amount and the amount of donation, and when the operation accepter accepts an instruction of inexecution of the donation, the charging processor performs the charging processing by subtracting, from the inserted amount of money, only the charging amount.

4. The image forming apparatus according to claim 1, wherein the operation accepter accepts through the operating device a designation of the amount of donation indicated by the instruction of execution of the donation within a range not exceeding a predetermined upper limit.

5. The image forming apparatus according to claim 1 further comprising:
   a storage device into which history data of the amount of donation is stored; and
   a display,
   wherein the control device further functions as:
   a calculator calculating, on a basis of the history data stored in the storage device, a total amount of donation made by all users within a predetermined period; and
   a first presenter that causes the display to display the total amount calculated by the calculator.

6. The image forming apparatus according to claim 1, further comprising:
   a storage device into which history data of the amount of donation is stored; and
   a display,
   wherein the control device further functions as a second presenter causing, on a basis of the history data stored in the storage device, the display to display a list with the amount of donation of each predetermined number of users who have used the image forming apparatus in a past.

7. The image forming apparatus according to claim 1, wherein
   the charging processor:
   manages a change reserve fund in the charging apparatus;
   when the operation accepter is accepting the instruction of inexecution of the donation, on a basis of the change reserve fund and of the remaining money remaining in the inserted amount of money after the charging amount was subtracted, determines whether or not a shortage of change will occur; and
   when the operation accepter accepts the instruction of execution of the donation, on a basis of the change reserve fund and of the remaining money remaining in the inserted amount of money after the charging amount and the amount of donation were subtracted, whether or not the shortage of change will occur, and
   when the charging processor determines that the shortage of change will occur, the controller does not execute the print job.

8. The image forming apparatus according to claim 7, wherein
   the charging processor:
   when the operation accepter is accepting the instruction of execution of the donation and the amount of donation is part of the remaining amount, determines whether or not the shortage of change will occur; and
   when the operation accepter is accepting the instruction of execution of the donation and the amount of donation is all the remaining amount, does not determine whether or not the shortage of change will occur.

9. The image forming apparatus according to claim 1, wherein after the notifier has performed the processing for giving the first notice, when the operation accepter accepts an instruction of inexecution of the donation, the charging processor performs the charging processing by subtracting only the charging amount from the inserted amount of money.

\* \* \* \* \*